July 30, 1963 M. MORGAN 3,099,780
CONTROL AND GAUGING SYSTEM FOR MILLING MACHINES
Filed Dec. 30, 1954 10 Sheets-Sheet 1

INVENTOR.
MARK MORGAN
BY
ATTORNEY

July 30, 1963   M. MORGAN   3,099,780
CONTROL AND GAUGING SYSTEM FOR MILLING MACHINES
Filed Dec. 30, 1954   10 Sheets-Sheet 2

INVENTOR.
MARK MORGAN
BY
ATTORNEY

July 30, 1963 M. MORGAN 3,099,780
CONTROL AND GAUGING SYSTEM FOR MILLING MACHINES
Filed Dec. 30, 1954 10 Sheets-Sheet 4

Fig. 6.

INVENTOR.
MARK MORGAN
BY
ATTORNEY

FORWARD
REVERSE

BINARY STORAGE

INVENTOR.
MARK MORGAN
BY
ATTORNEY

3,099,780
CONTROL AND GAUGING SYSTEM FOR
MILLING MACHINES
Mark Morgan, Johnson City, N.Y., assignor to International Business Machines Corporation, New York, N.Y., a corporation of New York
Filed Dec. 30, 1954, Ser. No. 478,735
1 Claim. (Cl. 318—162)

This invention relates to a motor control system for automatic milling machines. More particularly, this invention relates to a system for the control of milling machines, using information stored in numerical form in a suitable medium, such as punched paper tape or cards.

In the manufacture of master cams, it is desirable to avoid laborious and time consuming hand labor, to avoid the errors inherent therein, and to provide a smooth master cam surface from precalculated data. In the past cams have been cut by spotting discrete points on the cam contour with a cutter of accurately gauged diameter to provide an outline of a succession of scallops. After the cam blank was so cut, the scallops were removed and blended into a continuous contour by hand. Therefore, the accuracy of the contour has been partially dependent upon a human factor, i.e., the skill of the operator who does the above-mentioned cutting and blending.

It is an object of this invention to provide a means and a method for accurately cutting machined pieces by automatic means from stored numerical data to provide a smooth contour.

It is a further object of this invention to provide an automatic cam cutting apparatus having a rotary table for supporting the cam blank for cutting which automatically advances in predetermined increments.

It is the purpose of this invention to provide for the development of cams by automatically adjusting the longitudinal positionng of a rotary table upon which a cam blank is cut in relation to the fixed position of the cutting tool.

It is a still further object of this invention to provide a means and a process for the development of cams which comprise automatically adjusting the rate of feed of a longitudinal table in proportion to the increment of movement desired between fixed points on a rotary table which supports a blank from which the cam is cut so as to produec a continuous master cam surface.

It is still another object of this invention to make a master cam by milling a blank on a rotary table from precalculated data without reference drawings by automatically adjusting the rate of longitudinal feed of the rotary table in proportion to the increment of rotary movement between fixed points of the rotary table.

These and other objects of this invention will become more apparent upon consideration of the following description, taken together with the accompanying drawings, in which.

In general, this invention provides for the development of cams by cutting the cams on a rotatable base with predetermined steps of radial movement between fixed points of the rotatable base and automatically adjusting the rate of the longitudinal feed of the rotatable base in respect to the cutting tool, so that the cam mounted on the base may be generated automatically from precalculated data stored in numerical form on a suitable medium without reference drawings and without a machine operator. The automatically adjusted rate of longitudinal movement combined with the simultaneous action of the rotary table converts a single dimension data input into a two-dimensional surface. According to this invention, the value of the longitudinal rate of movement for a fixed time interval varies with the variation of the position of the rotatable base around its axis of rotation.

According to the specific embodiment of the invention, a blank from which a cam is to be milled is secured to a rotary table whose axis of rotation is parallel to the axis of rotation of the milling cutter. The rotary table is mounted on a supporting table and the supporting table is fixed with relation to movement on vertical and Y—Y horizontal axis but is capable of movement horizontally along its X—X axis. The centers of the rotary table and the cutter are disposed normal to and are on the X—X axis of the horizontally moving supporting table. The cutter and the cam blank, when rotating about their respective axes will generate a cam contour as dictated by the horizontal shifting of the supporting table. The contour is determined by the direction, extent and rate of the shifting of the horizontal table.

It is to be understood that while the various axes and movements are described with respect to the horizontal and vertical, these are only relative. The assembly may be mounted in any suitable position.

The control of the contour of the cam is determined by the relationship of the movement of the horizontal table to the degree or increment of angular motion of the rotary table concomitant or timed with the motion of the horizontal table. The duration of intervals of angular rate of the rotary table is variable, although it is kept essentially constant during milling of any given cam; but the rate of longitudinal movement during this interval is variable as determined by the computed data pertaining to the radial increments of the cam development. According to this invention, the positioning of the horizontal table on the X—X axis with respect to the angular position of the rotary table is controlled by a data-providing unit in which information representing the cam outlined is stored in coded numerical form. The feeding of the data in turn is checked by a counter which, being actuated by the horizontal table drive, is synchronized with the rotary table, so that at a predetermined arc of movement of the rotary table, new data is fed from the data-providing unit. The rotary table rotates at uniform speed and with each new increment of rotation there is transmitted information through a speed control to the longitudinal feed motor to energize the longitudinal feed of the rotary table on its X—X axis to the next position for the generation of the cam. The motor is a reversible variable speed motor so that the table can be moved in either direction on the X—X axis at desired speeds in the predetermined fixed time interval. The tabulated data represent the variations of the values of the radii of the cam at each angular position of the rotary table from the preceding position. The data constitute a series of incremental values; positive or negative depending on whether the cam rises or falls. Falls correspond to movement of the horizontal table to feed the cutting tool toward the center of the cam, and rises correspond to movement to feed away from it.

The data are stored in tape or equivalent data-storage medium such as cards, in a suitable numbering system or code. A binary code is preferably utilized in this invention. The data symbolizes linear increments of the horizontal table, however, the stored data is in numerical form. This means that if number one represents the minimum incremental step in inches or fraction thereof of which the horizontal table is capable, number seven for instance, represents an increment equal to seven times the above stated elemental incremental value. The data reading unit is advanced automatically by the rotary table. Thus, data representing the cam radial increments are automatically presented to the system by the independently moving rotary table.

The positioning of the horizontal table is checked by a counter which, associated with the table motor, transmits a checking impulse to control the motor at the end of each reading interval. As the rotary table is moved through an increment, new data is presented to control the movement of the horizontal table during the next following incremental movement of the rotary table, controlling the longitudinal movement motor and moving the table in accordance with the information in the data storage tape. The longitudinal movement is at different rates of speed as dictated by the data.

Figure 1:
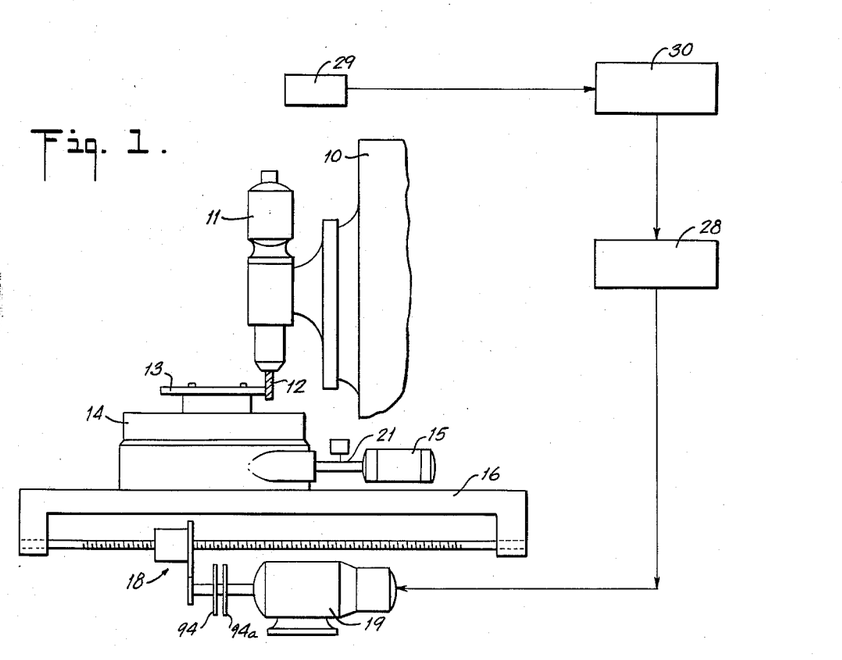
FIGURE 1 is a schematic drawing in elevation of the automatic cam miller of this invention.

Referring specifically to the figures, the schematic drawing of FIG. 1 shows a machine tool column 10 supporting a spindle motor 11 which drives a milling cutter 12 for cutting a cam from the blank 13. The blank 13 in turn is mounted on a rotary table 14 which is suitably driven by rotary table motor 15. A longitudinal table 16 driven by a feed screw 17 is movable on its X—X axis left and right across the drawing. The feed screw 17 is moved through a suitable screw feeding device 18 driven by a horizontal table motor 19.

Figure 2:
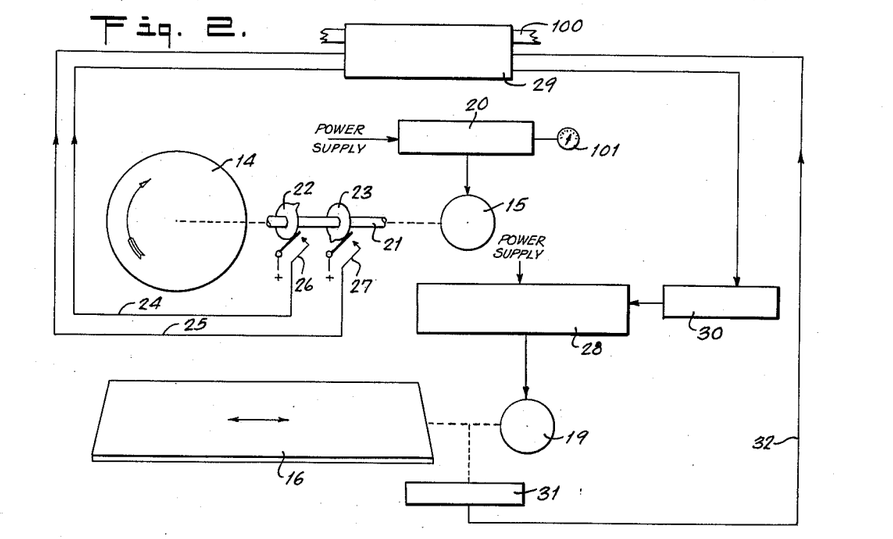
FIG. 2 is a schematic diagram of the power and feed controls for the moving tables of the cam milling device.

The means for powering and controlling the rotary table motor 15 and the horizontal table motor 19 are shown in FIG. 2 in connection with a control tape and a tape feed and read-out unit. The rotary table motor 15 is powered by a variable speed drive 20 which includes a variable speed control 101 to provide the motor 15 with an adjustable motion. The motor 15 drives the rotary table 14 through a shaft 21 and suitable gearing. Each rotation of the shaft 21 is thee quivalent of an incremental motion of the rotary table 14. A pair of cams 22 and 23 are provided on the shaft 21 for timing the indexing and resetting of the tape feed and reading unit. Pulses for indexing the tape feed are fed through lines 24 and 25 from respective switches 26 and 27. The switches 26 and 27 are closed by their respective cams 22 and 23 upon rotation of the shaft 21. Utilization of the timing pulses for indexing the tape feed is described in greater detail below.

The horizontal table motor 19 is essentially a variable speed motor driven from a suitable power supply, through a generator 28 and receives controlling information from the tape feed 29 through an amplifier 30. As mentioned above, the motor 19 has associated with it a counter 31 which feeds back checking information through a feed back circuit 32 to verify the compliance of the horizontal table position with corresponding signals from the tape 100 and tape read-out unit 29.

Figure 4:
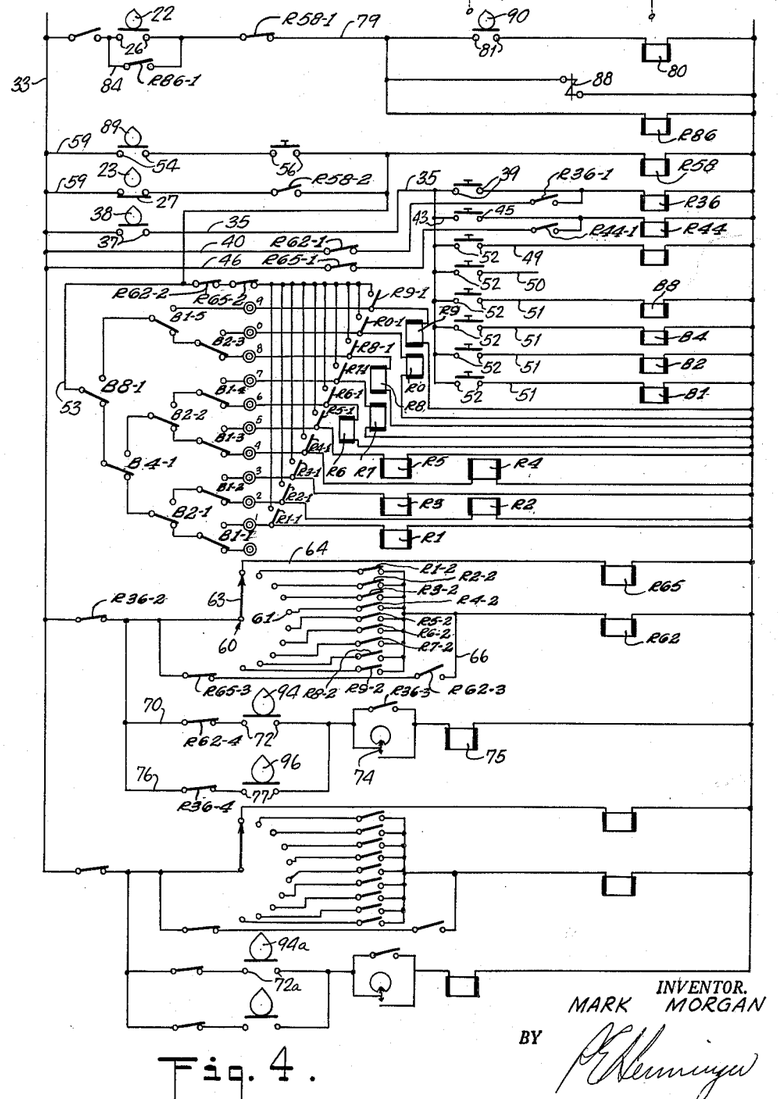
FIG. 4 is a circuit diagram for the cam milling apparatus.

FIG. 4 shows a control circuit for the movement of the horizontal table. The circuit of FIG. 4 is provided with a power supply line 33 which receives a suitably adjusted potential as a supply to the various elements of the control circuit. A sensing circuit 35 supplies power to a forward relay R36 through a sensing cam contact 37 which is operated by a sensing cam 38. The circuit 35 also contains a hole sensing pin 39 which is actuated by the control tape of the read-out unit 29. A by-pass conductor 40 is attached to the conductor 35 and contains a normally open contact R36–1 of the forward relay and a normally closed contact R62–1 of a stop forward relay R62. The control circuit is also provided with a reverse actuating circuit conductor 43 which is tapped off the actuating circuit between the sensing cam contacts 37 and the tape hole sensing pin 39. The reverse actuating circuit conductor 43 contains a reverse relay R44 and a reverse hole sensing pin 45. The reverse actuating circuit is by-passed by a circuit conductor 46 which is connected from the power line 33 to the circuit conductor 43 between contacts 45 and the reverse relay R44, so as to be effective in by-passing contacts 45 when conducting. The circuit conductor 46 contains a contact R44–1 of the reverse relay R44, which is normally open, and a contact R65–1 of a start forward relay R65, which contact is normally closed. A plurality of conductors 51 each contain a set of pins 52 which are actuatable by a control tape in the read-out unit 29, and relays for operating the horizontal table through action of a binary-decimal conversion matrix of the controls circuit system.

The binary decimal conversion circuitry is powered by a conductor 53 through the impulse cam contact 54 and the cam 23 and contact 27. The contact 54 is in series with a normally open tape actuated contact 56 and the contact 27 is in series with a normally open point R58–2 of a relay R58. The relay R58 is actuatable through a circuit conductor 59 which includes the cam contacts 27 and 54, the tape contact 56 and the contact R58–2 of the relay R58.

The counter 31, shown in FIG. 2, is made up of two parts—a forward counting part and a reverse counting part. The counters are advanced by a forward cam 94 and a reverse cam 94a, respectively, mounted on a shaft which is part of the transmission from the horizontal feed motor 19 to the lead screw 17 for the horizontal table 16.

Figure 4A:
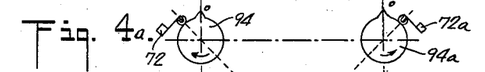
FIG. 4a is a sketch of control cams in the apparatus of FIG. 4.

Reference lines 0—0 of the cams 94 and 94a in FIG. 4a represent the zero or rest position of the horizontal drive at any given time. Forward cam 94 and reverse cam 94a are, respectively, associated with a forward cam contact 72 and a reverse cam contact 72a. Contacts 72 and 72a are located in symmetrically opposite positions in respect to reference line 0—0. Cam 94 and contact 72 are operative in the circuit during forward feed motion only, and cam 94a and contact 72a are operative in the circuit during reverse feed motion only, as will be hereinafter described.

One turn of the cam-supporting shaft corresponds to one unit of feed increment at the horizontal table. In the forward motion, the cam/contact relationship and the direction of rotation of the cam, clockwise in FIG. 4, are such that cam 94 makes one complete turn before contact 72 operates, and the same is true of the opposite or counterclockwise rotation of reverse cam 94a and its associated contact 72a. This technique insures that, whenever the horizontal drive reverses, the table feeds one complete increment of motion before its corresponding unit count is registered in the counters. These two parts of the counter 31 are identical and, therefore, duplicate each other except for providing equivalent and opposite motion of the longitudinally movable table 16 through actuation of the table motor 19. The description of the counter operation, set forth herein, refers to the forward counting operation. It will be understood, however, that what is said in regard thereto applies equally to the operation of the reverse counter.

The counter mechanism is composed of an emitter 60 having 10 positions or steps 61. Nine of these steps are connected to respective relay points R1-2 through R9-2 of a set of decimal feed increment relays R1 through R9. The relay points R1-2 through R9-2, when closed, complete a circuit to the stop forward relay R62. A wiper arm 63 of the emitter 60 is rotatable so as to successively and separately complete a circuit with individual relay points R1-2 through R9-2 and through them actuate the stop forward relay R62. Through an individual circuit conductor 64, the wiper arm 63 may be connected to the start forward relay R65 when the wiper arm is on the first position or step of the switch. A by-pass circuit conductor 66 connects the power supply line 33 to the stop forward relay R62 through a normally open contact R62-3 of the stop forward relay R62, and a contact R65-3 of the start forward relay R65. A contact R36-2 of the forward relay R36 is positioned between the power supply line 33 and the wiper arm 63. A forward cam circuit conductor 70 connects an add forward coil 75 of the counter to the power supply line 33 by way of the relay point R36-2 and contains a normally closed relay point R62-4 of the stop forward relay R62, the forward cam contact 72, the parallel circuit of a normally open contact R36-3 of the forward relay and a counter actuated switch 74. By passing contacts R62-4 and 72, a circuit conductor 76 has reset cam actuated contacts 77 and a normally closed contact R36-4 of the forward relay.

A control magnet circuit conductor 79 connects a tape reader control magnet 80 and control magnet cam actuated contacts 81 to the power supply line 33 through a normally closed contact R58-1 and the contact 26 actuated by the cam 22. A by-pass circuit conductor 84, around the contact 26, contains a normally open contact R86-1. A relay R86 for actuating contact R86-1 is connected to the power supply line 33 through the contacts R58-1 and 26 or R86-1. It will thus be seen that the closing of contacts 26 with contact R58-1 normally closed will actuate relay R86 and in turn close its contact R86-1. Thus the circuit conductor 79 which contains the contacts 26 as well as the reader control magnet 80 and the relay R86 will be held connected to the power supply line 33 until the contact R58-1 is open. A read-out unit clutch 88 is powered by the circuit conductor 79 through the contacts 26, R86-1 and R58-1.

Figure 5:
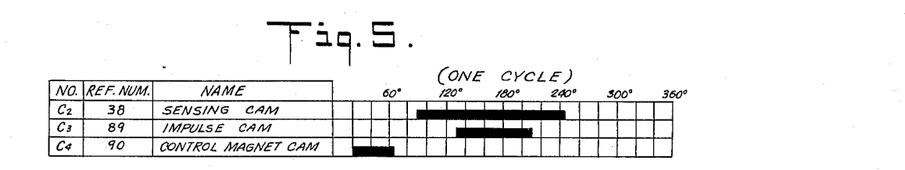
FIG. 5 is a tape reader timing chart.

FIG. 5 is a timing chart of the sensing cam 38, the impulse cam 89 and the reader control magnet cam 90. The cams 38, 89 and 90 operate in conjunction with the cams 22 and 23 to regulate the reading and transmission of data provided by the tape 100. The tape data in the form of punched holes operate the various tape reading contacts 39, 45 and 52 to generate control pulses to control movement of the horizontal table longitudinally during the rotary table interval. The rotary table shaft 21 operates cam 22 which closes its contact 26 once every step, for instance every 1° step. Circuit 79 to clutch 88 is energized through normally closed contact R58-1 and cam contact 26. Clutch 88 advances tape 100 one step and a new set of numerical data are ready for presentation to tape read unit. Relay R86 is in parallel with clutch 88 and becomes energized simultaneously with it. Contact R86-1 of relay R86 closes and presents a path parallel to contact 26. Cam 90 in tape read unit 29 closes the circuit to the reader control magnet 80 which becomes energized through contact 81 of control magnet cam 90, circuit conductor 79, normally closed contact R58-1 and contacts R86-1 or 26.

Control magnet 80 preconditions the tape reader 29 to sense punched holes in tape 100. Sensing cam 38 closes its contact 37. The sensing pins in the read unit 29 are moved against the tape 100 by action of control magnet 80. Whenever a hole is present in the tape contacts 39, 43 and 52 corresponding to the tape holes are closed. The circuit to relays R36, R44, B1, B2, B4 and B8 is energized, according to the tape data, through circuit conductor 35 and cam contact 37. This circuit determines the direction, the amount of motion, and the feed rate for the longitudinal table for each corresponding position of the rotary table. Impulse cam 89 in the tape read unit 29 closes its contacts 54 while sensing cam 38 is closed as shown in the chart of FIG. 5. The circuit to relay R58 is energized through conductor 59, contacts 54 and 56. Normally open contact R58-2 of relay R58 closes, thus by passing contact 54 and relay R58 remains energized through contact R58-2 and normally closed cam contact 27. Simultaneously, normally closed contact R58-1 also of relay R58 will open and de-energize clutch 88 and relay R86. This action prevents the clutch from advancing the tape more than one step.

When the tape actuates the forward contact 39, it energizes the forward relay R36 which, in turn, closes its normally open forward contacts R36-1 and R36-3 and opens its normally closed forward contact R36-4. It is to be noted that it simultaneously opens and closes a forward contact in the reverse counter to incapacitate the reverse counter operation of the counter 31. A similar but opposite action occurs when the tape actuates the reverse contact 43 and thereby energizes the reverse relay R44. Simultaneously, the tape presents the binary numbers which will determine the amount of motion of the longitudinal table 16 and its feed rate. The tape data will select the appropriate combination of binary relays of the group B1 through B8, and these in turn will operate the contacts B1-1, etc. of the binary to decimal conversion network to energize the appropriate one of the decimal feed increment relays R0 through R9. A decimal feed increment relay when energized will close its holding circuit by closing the related one of the contact group R0-1 through R9-1. At the same time, the selected decimal increment relay will close the related one of its contacts of the group R1-2 through R9-2 in the emitter 60, and also the related contact of the group R0-3 through R9-3 in the voltage dividing system of FIG. 8 which controls the speed of the horizontal table motor.

The longitudinal table feeds forward, causing cam 94 to close contact 72. One turn of cam 94, or one pulse of contact 72, as stated, corresponds to one unit feed increment. With each rotation, each closure of the contact 72 provides a pulse to the add forward coil 75 which operates the wiper 63 of the emitter 60 the wiper arm 63 of the emitter moving from one of the contacts 61 to the next. One of the contacts 61 will present a closed circuit to the wiper arm 63 by reason of the operation of its related decimal feed increment relay, and when the wiper completes such circuit to the power line 33, the stop forward relay R62 is connected to the power supply line 33. This closes the normally open contact R62-3 and opens the normally closed contact R62-4. It also opens a normally closed contact R62-2 in the binary-decimal conversion matrix. The operation of the forward cam 94 is thus rendered ineffective and the reset cam 96 operating at a high rate of rotation, such as 50 pulses per second, sends a number of pulses through the circuit 76 to the add-forward coil 75. The add-forward coil 75 rapidly advances the wiper arm 63 to the contact of the circuit 64 which connects the start-forward relay R65. The start-forward relay opens its normally closed contact R65-3 in the by-pass circuit 66. Thus, the relay R62 is de-energized and the emitter is conditioned for the data on the longitudinal movement for the next rotary table interval.

Figure 6:
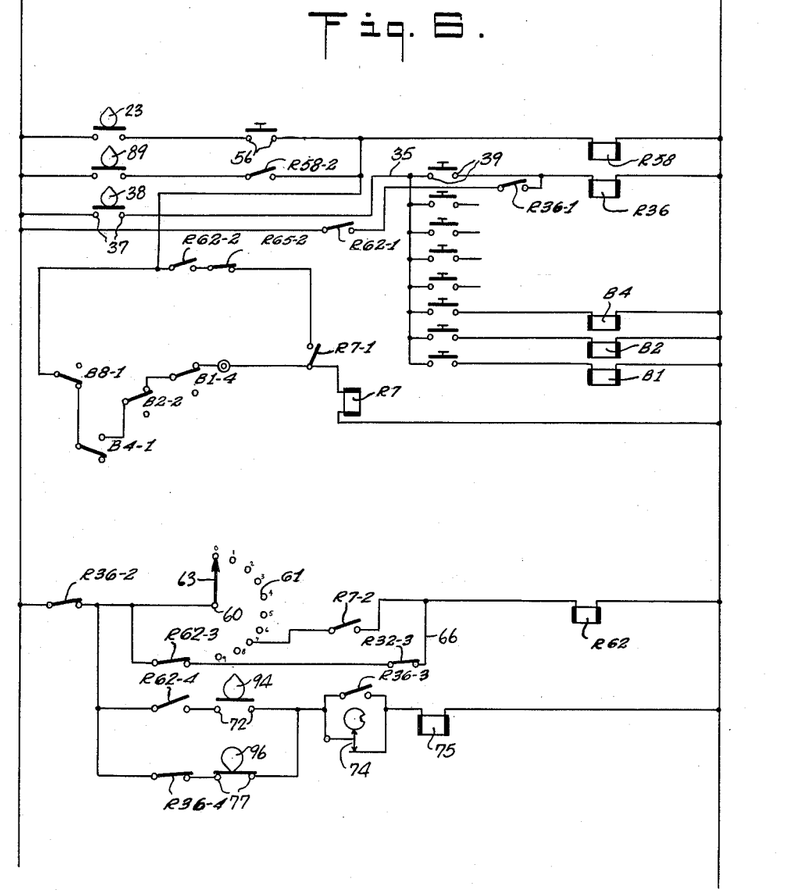
FIG. 6 is a circuit diagram of a portion of the circuit shown in FIG. 4 in one phase of operation.
Figure 7:
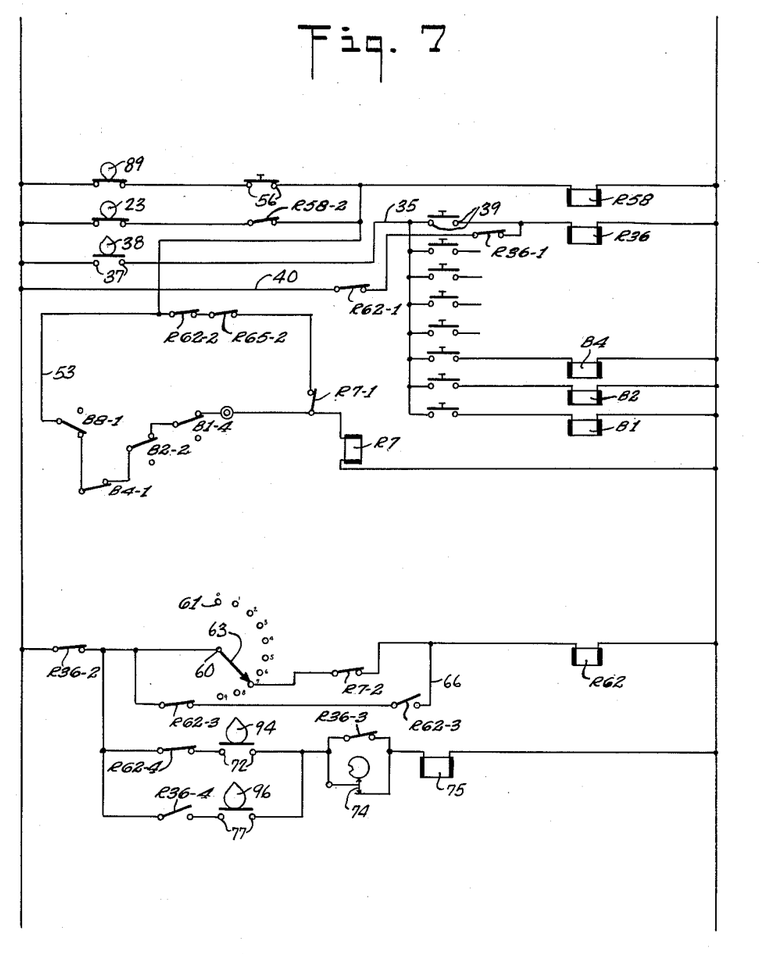
FIG. 7 is a circuit diagram for the apparatus of this invention in another phase of operation.
Figure 8:
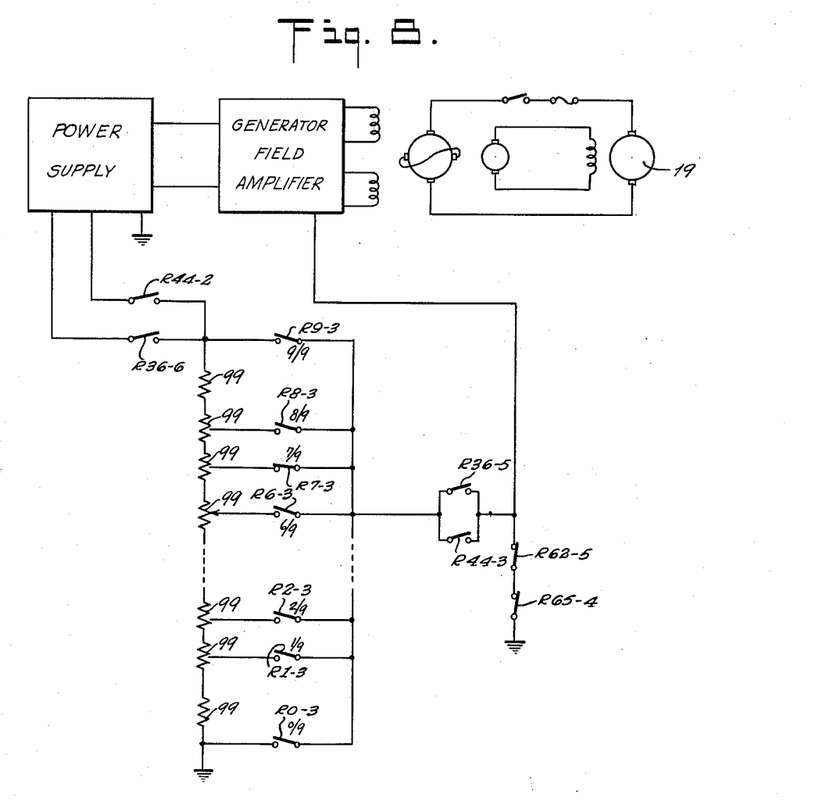
FIG. 8 is a diagram of a system for operating the horizontal table motor of the device of this invention at variable speeds.

FIGS. 6 and 7, show, by way of example, the control circuitry for the operation of the table 16 as occurring for a movement of the table through 7 increments. In FIG. 8, the circuit of the proportional potential voltage generator 28 is shown adjusted to the 7/9 feed rate. As explained above, the description is confined to forward motion as forward and reverse operations are identical. Upon receiving a forward signal from the tape 100, the forward relay R36 is energized closing its normally open points R36–1 and R36–3 as shown in FIG. 7 to condition the table 16 for movement in the forward direction. At the same time, the tape 100 energizes relays B1, B2 and B4 which correspond to 7 in a binary code. Contacts B4–1, B2–2 and B1–4 close and energize relay R7 which corresponds to 7 decimal. Contact R7–1, shown in FIG. 7, closes to by-pass binary contact and hold relay R7 energized and its contact R7–2 closed. This conditions the circuit through the stop forward relay R62 for operation. At the same time the relay R7 will close its point R7–3 in the voltage dividing system of FIG. 8 is closed to drive the motor 19 at 7/9 feed during the increment of rotary movement of table 14.

The cam 94, through the drive of motor 19, energizes the add forward coil 75 intermittently to advance the wiper arm 63 by a total of 7 pulses until it reaches terminal 7 and completes a circuit through contact R7–2 of FIG. 7. The stop forward relay R62 is then energized and acts to de-energize the forward relay R36 by opening its contact R62–1. At this point, the table 16 has moved the rotary table 14 radially a total of 7 increments at a 7/9 rate of speed. The milling cutter 12 will have cut the desired surface of the cam in the angular motion increment and further movement is arrested by stopping the motor 19. Motor 19 is stopped by opening the 70% feed rate switch in the generator control and contact R62–1 in the holding circuit of forward relay R36.

The rotary table continues to rotate and the emitter 60 is quickly reset to be in condition to receive the next instruction. The emitter is reset by the add forward coil 75 actuated by the cam 96 which rapidly pulses the coil 75 on closing the contact 77. The coil 75 is de-energized in the reset operation when the contact 74 is opened by its cam. This cam opens when the wiper arm 63 reaches the zero position. The stop forward relay R62 is also de-energized at this point by the energization of the start forward relay R65 which opens its normally closed point R65–3 in circuit conductor 66. The control mechanism is then ready to receive the next instruction from the tape 100.

The table 16 is moved through the longitudinal displacement distance at a rate of speed which is in proportion to the rotary table speed. The speed of the longitudinal table is automatically adjusted in proportion to the increment of movement between the fixed points on the rotary table. The adjustability of this rate of movement of the longitudinal table allows the table to move in a longitudinal direction at a fast rate for one step, as might occur when a steep slope was being cut in the face of the cam; and then the longitudinal movement of the longitudinal table 16 can be adjusted so as to be slow as would occur when the cam surface has a moderate slope. A dwell or circle in the cam is obtained when the longitudinal feed is zero.

FIG. 8 shows the schematic wiring diagram for controlling the output voltage of the generator 28 (FIG. 1) which in turn is controlled by the read out unit 29 (FIG. 1) which actuates one of the 10 rates-of-feed increments. In this example, the 7/9 feed rate is employed for the purpose of illustration. The 7/9 feed rate contact R7–3 closes along with the forward actuating switches 39 (FIG. 4), binary relays B1, B2, B4 and decimal relay R7, to provide the longitudinal movement to the table 16 at 7/9 maximum rate of speed. This means the speed of the drive of the table 16 is rated in proportional increments from 0/9 to 9/9. In this illustration, the rated speed for moving the horizontal table is at the 7/9 rate. The rate of speed of the drive motor is dependent upon the total number of increments of longitudinal movement desired for an increment of rotary movement. For example, if it is assumed that the maximum rate of movement of the horizontal table is .0036 inch per second, and the feed range is varied in nine equal feed steps, it will be seen that the minimum feed rate will be .0004 inch per second. The horizontal table can, therefore, be set up to move on the X—X axis at increments of .0004 inch and not more than a total of .0036 inch per second or per step. The nominal radii (as given by the equation of the cam) may differ from the actual possible values a quantity which cannot be greater than .0002 inch (.0004"/2). In view of the fact that the cam is computed on the basis of radii increments, cumulative errors will occur unless this possible difference of .0002 inch at each position is analyzed by the computer and taken into consideration in determining the next increments.

Figure 9:
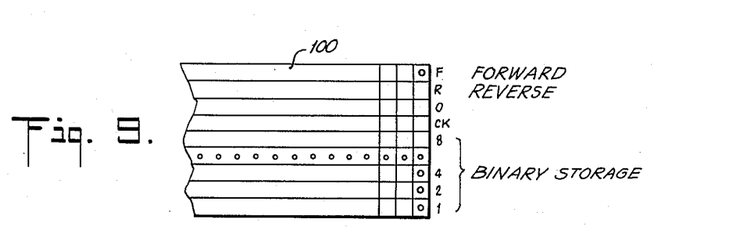
FIG. 9 is a plan view of an 8 hole tape.

In operating the system, the information regarding the successive positions of the longitudinal table 16 on its X—X axis is stored in the form of holes punched in a tape 100, as shown in FIG. 9. Each unit of information determines where the succeeding position of the longitudinal table 16 will be in terms of the number of unit increments required of the motion of the table to reach said succeeding position, as well as the speed or rate of movement of the longitudinal table to attain the position. This is represented on the tape 100 as digital information in the form of the number of steps and the percentage of the maximum speed. For example, each incremental step is .0004 inch to correspond to 1/9 of the rate of the maximum speed.

For the purpose of this invention, the data on the tape may be prepared in either binary or decimal form although the binary form is preferable. The information must be translated into analogue form, suitable to control the drive of table 16 and the feed back system, through counter 31 and circuit 32. The amplifier of generator 28 includes a plurality of resistances whose values determine the speed of the motor 19. These resistances are shown in FIG. 8 as resistors 99 which can be varied, as explained above. The resistors 99 are cut in and out of the circuit by the contacts R0–3 etc. of the decimal feed increment relays, as explained above. The relay contacts are therefore controlled by the relays which are energized through circuits which conduct through holes in the tape 100. It will be seen that the digital data on the tape can be used to provide variations in the resistors 99, as explained above, so as to vary the voltage of the generator and consequently vary the rate of feed of the motor 19.

The circuit of FIG. 8 also has imposed thereon the necessary controls for determining forward and reverse operation of the motor 19, and also for supplying and cutting off power therethrough. Accordingly, the points R36–5 and R36–6 of the forward relay R36 when closed, will supply current to the motor 19 to drive it in the forward direction, and points R44–2 and R44–3 of the reverse relay, when closed, will supply current to drive the motor in the reverse direction. The relay points R62–5 and R65–4 of the stop forward relay R62 and the start forward relay, respectively, condition the circuit for operation.

The cams 22 and 23, shown in FIGS. 2 and 4, serve to operate contacts 26 and 27, respectively. The cams 22 and 23 are mounted on the shaft of the motor 15 which drives the rotary table; the cams 22 and 23 serve to control the positioning of the longitudinal table 16 and the indexing and resetting of the emitter 60. Thus, the cams 22 and 23 control the receiving of information and the timing of information from the tape 100 to the binary decimal conversion matrix and the emitter 60.

As shown in FIG. 4, the cam 38 closes to condition the circuits for receiving information from the tape 100 in the read-out unit 29. While the sensing cam 38 has the contacts 37 closed, impulse cam 89 causes the contacts 54 to be closed to condition the control magnet circuit so that only one pulse is received at the control magnet 80.

When the tape 100 passes through the read-out unit 29, the information stored in the binary storage columns actuates the circuits of the device of this invention, as described above. The following table sets forth the type of information which may be presented by the tape 100.

Table I

| Card punch position | Tape holes | Impulse counter | Motor speed | Motor feed | Longitudinal feed, inches |
|---|---|---|---|---|---|
| 12 | F | | | Forward | |
| 11 | R | | | Reverse | |
| 0 | 8-2 | 0 | 0 | 0 [1] | .0000 |
| 1 | 1 | 1 | 1/9 | 1 revolution | .0004 |
| 2 | 2 | 2 | 2/9 | 2 revolutions | .0008 |
| 3 | 1-2 | 3 | 3/9 | 3 revolutions | .0012 |
| 4 | 4 | 4 | 4/9 | 4 revolutions | .0016 |
| 5 | 4-1 | 5 | 5/9 | 5 revolutions | .0020 |
| 6 | 4-2 | 6 | 6/9 | 6 revolutions | .0024 |
| 7 | 4-2-1 | 7 | 7/9 | 7 revolutions | .0028 |
| 8 | 8 | 8 | 8/9 | 8 revolutions | .0032 |
| 9 | 8-1 | 9 | 9/9 | 9 revolutions | .0036 |

[1] When "0" is punched, neither "F" (forward) nor "R" (reverse) is punched.

It will be seen that each of the motor speeds of the motor 19 is represented by a different arrangement of tape holes or card holes, as shown in the two leftmost columns. This information, in turn, is matched by a variation of impulses for the impulse counter, as shown in column 3. The rate of speed of the motor is shown in column 4, while the direction of the motor and the number of revolutions of the motor in the incremental time is shown in the 5th column. All of this results in a given longitudinal feed displacement, which is shown in the rightmost column.

Figure 3:
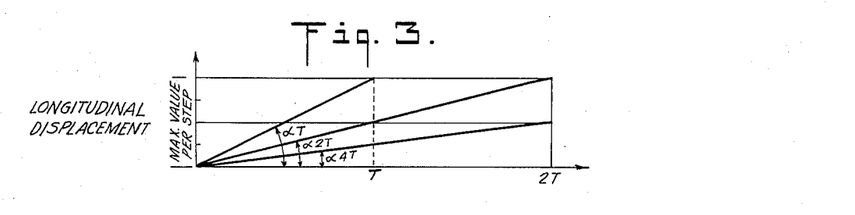
FIG. 3 is a graph depicting the relationship between the longitudinal displacement in the automatic cam miller and the time duration of the predetermined intervals of rotary movement.

It is a feature of this invention, as stated, that the rate of speed of the motor 19 is proportional to the longitudinal displacement of the table 16. Thus, as shown in FIG. 3, the rate of longitudinal movement varies with longitudinal displacement to provide a straight line relationship therebetween. As a result, the milling cutter 12 in traversing the path between various points which are plotted by the information on the tape 100 moves along the straight line proportion between the distance of the longitudinal displacement and the time during which the motion takes place. The cutting action of the milling cutter 12 on the blank 13 is in direct response to the proportional relationship between the longitudinal displacement and the interval of time between tape readings.

Figure 10:
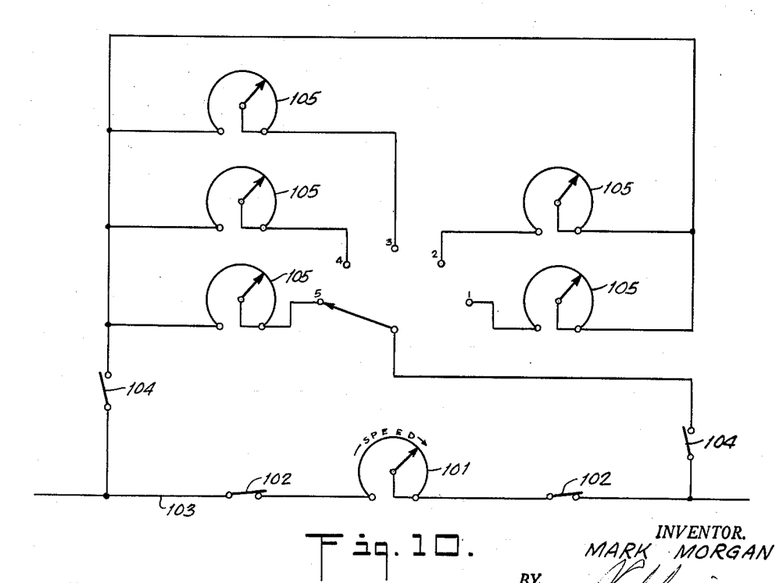
FIG. 10 is a diagram of the system of the rotary table control.

The rotary table 14 is essentially a constant feed drive for any given cam; however, it is the tangential milling speed which should be about constant. Therefore, the angular speed of the rotary table may be varied to suit cams of various basic diameters. The feed for the rotary table, as shown in FIG. 2, and as previously stated, is provided through variable speed drive 20. The drive 20 has associated with it a speed control 101 which is a variable resistance for varying the voltage to the motor 15 and consequently varying the speed of rotation of the rotary table 14. FIG. 10 shows a circuit for control of the rotary table 14. The speed control 101 is shown in a circuit conductor 103 which is connected into the variable speed drive 20. The hand control of the resistance of control 101 can be cut out by opening contacts 102 of the circuit conductor 103 and closing contacts 104 to connect in an automatic control of the speed of motor 15 in one of five positions, as shown. These five positions provide five fixed speeds for the motor 15 ranging from minimum rate to a maximum rate through a variety of potentiometers 105 suitably set. The rotary table 14 moves from one position to another in equal time, while the horizontally movable table 16 moves from one position to another in equal time but in varying rates of speed. The incremental movement of the rotary table is the basis for the information which is printed on the tape 100 and which controls the rate of speed of the horizontally movable table 16. Accurate results are obtained in this device only if the longitudinal table is properly related to the angular displacement of the rotary table. Therefore, the drive for the rotary table has mounted on it a shaft positioning unit in the form of a cam-limit switch system in the form of the cams 22 and 23. The purpose of this system is to control the reading time and otherwise to control the time of the issuance of the command for the positioning of the horizontally movable table 16. The information to the horizontally movable table 16 is in synchronism with the position of the rotary table. Thus, it is the rotary table 14 and the positioning of the rotary table 14 which dictates and controls the sensing of information for the movement and positioning of the horizontal table.

The rotation of the rotary table is at a constant speed but the tangential milling speed should be approximately the same rate for various cams. Consequently, the angular speed of the rotary table is preferably varied to suit cams of various basic diameters. As a result, it will be seen that it is desirable to have a variable speed drive for the rotary table in order to keep the accuracy for large and small cams. It is also necessary to vary the number of program points as the diameter of the cams increase.

In cutting large cams, it may be necessary to supply calculated data for the rotation of the rotary table on the basis of a rotary increment of one-half degree, rather than one degree, as is used for cutting small cams and as is applied in the circuit described in FIG. 4. Accordingly, the circuit conductor 50, having contacts 52, is indicated in FIG. 4 as available to provide one-half degree indexing of the rotary table 14.

The apparatus of this invention with little change, can be employed as a means for comparing the dimensions of a finished piece with computed dimensions when the computed dimensions are given in tabulated form. By reference to FIG. 14, it can be seen that the milling cutter 12 of FIG. 1 may be substituted by a stylus 220 having the same outer diameter as the milling cutter 12. The spindle motor 11 of FIG. 1 may be removed and replaced by a cable which serves to transmit signals indicating the position of the stylus. The signal is transmitted to an amplifier 30a which is the equivalent of amplifier 30 as shown in FIG. 2. The signals from the amplifier are relayed to a generator 28a which, controlling the speed and direction of motion of the motor 19, determine the motion of the horizontal longitudinally movable table 16 in synchronism with the rotation of the rotary table 14. The cams 94 and 94a on the longitudinal drive shaft are provided with a circuitry so a revolution counter 31 is reset to 0 at every step of the rotary table by the action of independent pulses. A cam to be gauged is fixed into position on the rotary table 14 and brought into contact with the stylus at 0 or starting point. The stylus is fastened to the rigid machine column 10, so that its axis is fixed in space with respect to the cam and the rotary table and the horizontally movable tables 14 and 16, respectively. The cam rotating with the table 14 presses on the stylus tending to deflect it. This deflection energizes the generator 28a through the amplifier 30a acting on the motor 19 to cause the feed screw 17 to drive the table on the X—X axis. The drive of the table 16 moves the cam with relation to the stylus so as to keep the deflection on the stylus constant. This system is usually identified as a null-seeking servo. The distance the table 16 moves between rotary steps of the table 14, represents the rises and falls in the shape of the cam. These values are measured in the revolution counter in terms of revolutions of either of the cams 94 or 94a on the shaft of the longitudinal table motor 19. In this way the revolution counter becomes the gauge for the dimension of the cam, so that at equal positions of the rotary table, equal numbers are registered by the counter when the machine is stylus controlled.

Figure 11:
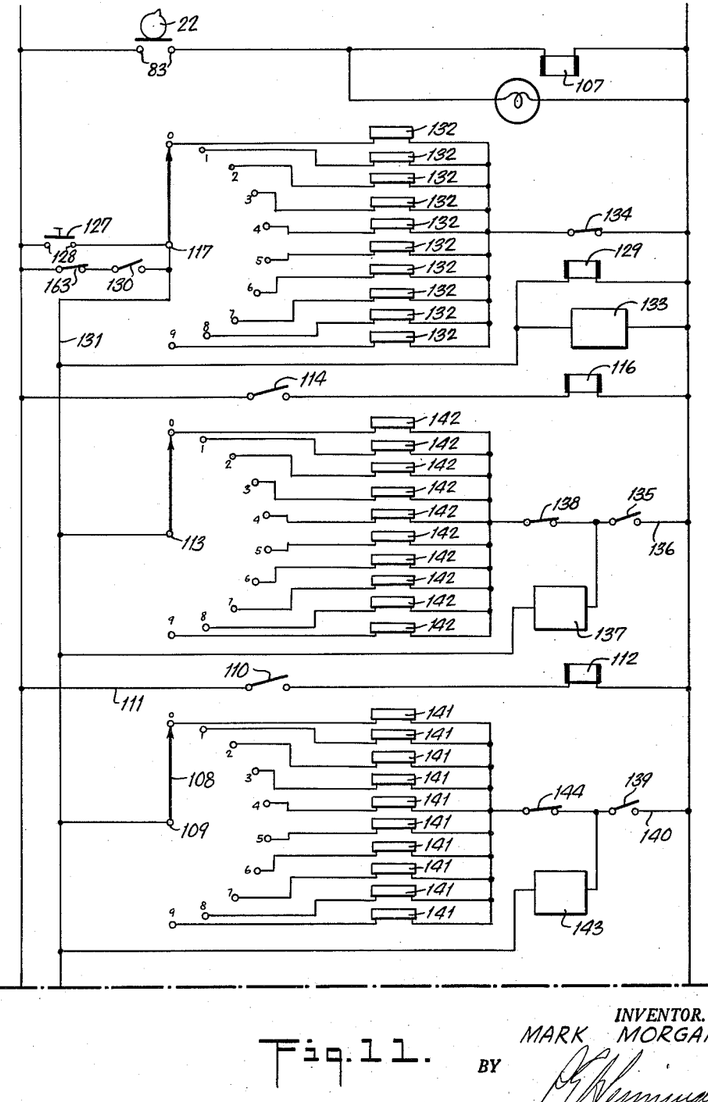
FIGS. 11, 12 and 13 show wiring diagrams of gauging and printing the position of the generated cam surface.
Figure 12:
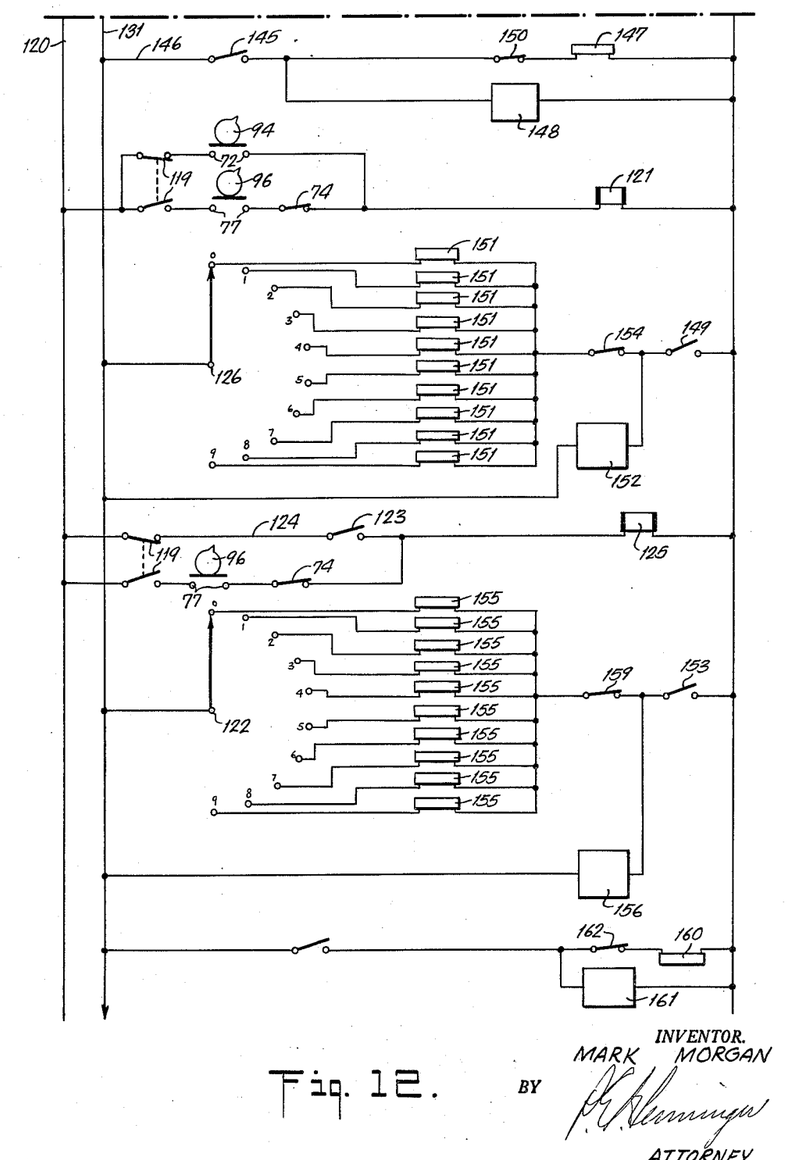
Figure 14:
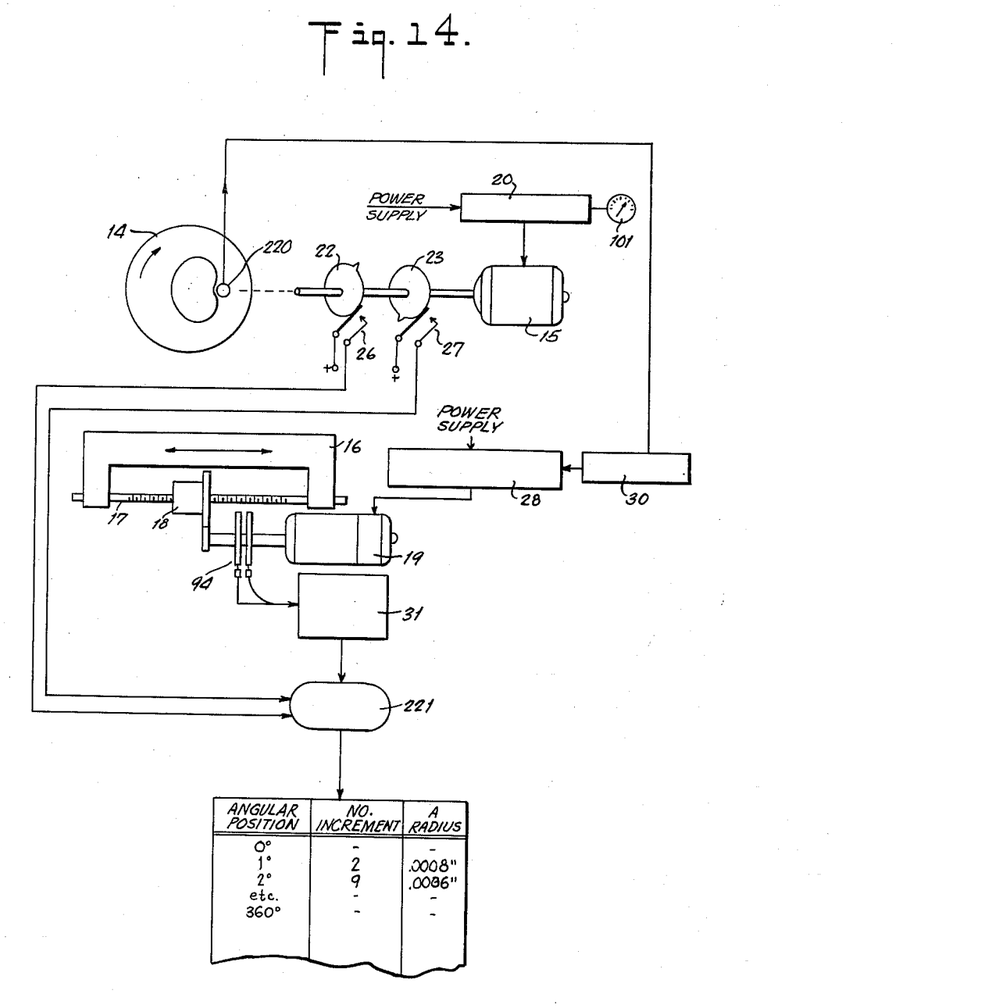
FIG. 14 is a schematic diagram of the gauging means similar to the diagram shown in FIG. 2 for the generating operation.

The schematic wiring diagram of FIGS. 11 and 12 shows the automatic gauging system for printed digital gauged data. For the purpose of describing this system and its operation, it will be assumed that it is connected to a rotary table and horizontally, longitudinally movable table apparatus, as shown in FIG. 14. The cam 22 (FIG. 11) of the rotary table motor shaft 21 is shown with its contacts 83 in a conductor 103 for actuating an advance coil 107. As described above, the cam 22 indexes once every given increment of angular motion of the rotary table of the device of this invention. In the described embodiment, this angular increment has been assumed to be 1°. With each indexing of the cam 22, the advance coil 107 is pulsed, operating an arm 108 of a units counter 109. The units counter 109 registers 10 units of angular movement in one rotatoinal operation. Each energization of the advance coil 107 moves the arm 108 from one contact of the counter 109 to another. When the arm 108 completes one rotational operation, it returns to the 0 or 10 position and simultaneously closes a switch 110 in a conductor 111, which closes a circuit through an advance coil 112. Thus, the coil 112 is pulsed advancing one position the arm of a tens counter 113. The switch 110 opens when the units counter 109 is again advanced and the tens counter 113 is advanced one contact for each complete rotation of the units counter 109. A complete 10 steps rotation of the counter 113 closes a switch 114 in a conductor 115 to energize an advance coil 116 and operate a hundreds counter 117 in a similar manner. The counters 109, 113 and 117 thus register the angular position of the rotary table in terms of incremental rotational steps.

The position of the longitudinal table is detected by the action of the stylus bearing against the measured cam, as described above. Through the action of the stylus, the horizontal table motor 19 moves the table 16. This response of the motor 19 to the stylus is reflected in the operation of the forward cam 94, which is shown in FIG. 12. The cam 94 indexes once every incremental movement of the table 16 in a longitudinal or radial direction along the X—X axis, as described above. In the described embodiment, this incremental indexing represents a movement of .0004 inch. The rotation of the forward cam 94 by the motor 19 causes the closing of the contacts 72 for each indexing of the forward cam 94. For the purpose of gauging the cam, a switch 119 is set in gauged position as shown in FIG. 12 to complete a circuit from a main conductor 120, through the switch 119, the contacts 72 and an advance coil 121 with each closing of the contacts 72. Thus, each closing of the contacts 72 advances the arm of a units counter 122. The units counter 122 registers the incremental radial or longitudinal movement of the table 16 as determined by the motor 19 under the control of the stylus. One cycle of rotation of the units counter 122 closes a switch 123 in a conductor 124 which energizes an advance coil 125. The advance coil 125 actuates a tens counter 126. The tens counter 126 is advanced one digital counter for each cycle of rotation of the units counter 122. Thus, the position of the horizontal longitudinally movable table 16 is registered by the counters 122 and 126.

While the above description of the registering of position on the counters 122 and 126 is described in connection with a forward motion, it will be understood that a similar action takes place with a reverse motion. The reverse cam and its counters are omitted from the present description for the sake of brevity.

In the digital gauging system shown in FIGS. 11 and 12, the registration of the contour of the gauged cam is reported by a printing operation. The system of FIGS. 11 and 12 represents a printing apparatus such as an IBM Cardatype document writer 221 in FIG. 14. The impulses from the cams 22 and 94 are fed into the printing system. When the rotary table 14 has advanced to an angular position, at which it is desired to gauge the radial dimension of the gauged cam, the rotary table 14 stops. A print button 127 (FIG. 11) energizes the system of FIGS. 11 and 12 to record the angular position of the table 14 and the number of radial increments which the table has travelled in a longitudinal direction from the preceding angular position or reading.

The print operation of the system initiated by the closing of print contacts 128 is followed by the energization of a coil 129 which closes a hold contact 130, otherwise normally open. This connects the conductor 120 with a conductor 131 and supplies a voltage to all of the counters 109, 113, 117, 122 and 126. The counter 117 registers its position through one of a group of solenoids 132, each of which is connected in a circuit with one of the contacts of the counter 117. The solenoid 132, which is in series with the counter 117, is the solenoid 132 which prints at that particular angular position of the rotary table 14. This printing operation registers the hundreds angular position.

When the printing solenoid 132 effects the printing operation, a timer 133 is energized. The timer 133 after its predetermined timing period has elapsed opens a normally closed switch 134 and closes a normally open switch 135 in a conductor 136, which closes a circuit through the tens counter 113. One of a group of solenoids 142 of the counter 113 is energized to register a position of the arm of the counter 113. As in the case of counter 117, the solenoid, which is in series with the counter contact with which the counter arm is engaged, will print. Simultaneous with this printing operation, a timer 137 is energized. The timer 137 operates to open a normally closed switch 138 in the conductor 136 and to close a normally open switch 139 in a conductor 140. The conductor 140 completes a circuit through the units counter 109. One of a group of solenoids 141 is energized in the same manner as the print solenoids 132 and 142. Thus, the angular position of the rotary table 14 is automatically printed in a number of degrees.

When the rotary table 14 angular position has been printed, a spacing is effected through the action of a timer 143 connected to the conductor 140. The timer 143 serves to open a normally closed switch 144 and close a normally open switch 145 in a conductor 146 to close a circuit through a spacing solenoid 147. Simultaneously, a timer 148 is energized which, operating to close the normally open switch 149, completes a circuit through the counter 126. The timer 148 simultaneously opens the normally closed switch 150 in the conductor 146.

The closing of the circuit through the counter 126 energizes one of a group of solenoids 151 in the same manner as described above in connection with the counters 109, 113 and 117. The number of increments of radial movement is thus registered in tens. A timer 152 operates to close the circuit through the counter 122 by closing a normally open switch 153 as it opens a normally closed switch 154. One of a group of solenoids 155 is energized by the closing of the circuit through counter 122 and the number of unit increments of radial movement is printed.

When the forward longitudinal incremental motion has thus been registered, a timer 156 opens a switch 159 in the counter 122 circuit. A carriage return solenoid 160 in the conductor 158 returns the print carriage to its original position and energizes a timer 161 which opens normally closed switches 162 and 163. The opening of the switch 163 breaks the contact through the coil 129 and disconnects the conductor 131. Thus, the counters are disconnected and free to operate without energization of their respective solenoids.

It will be understood that the normally open and normally closed switches return to their normal condition in preparation for the next succeeding print operation.

To prepare the counters for the further rotation of the table 14 and motion of the table 16, the reset switches 119 and 119a, associated respectively, with the counters 126 and 122, are closed in reset position to disconnect the forward cam contacts 72 and to connect the conductor 120 to the reset contacts 77 and 77a. The reset cam 96 then generates reset pulses which operate on the counters 126 and 122 through their respective advance coils 121 and 125. By the pulses of the coils 125 and 121, the arms of the respective counters are returned to zero. When the counters 122 and 126 reach the zero position, they automatically open the switches 74 in their respective reset circuits. The opening of the switches 74 serves to disconnect the respective advance coils 125 and 121, so that the counters do not move further than zero during the reset operation. The counters thus remain at zero and are ready to advance again when the switches 119 and 119a are shifted to the gauge position and the motion of the rotary table 14 is resumed.

The recorded information from this gauging operation may be compared with the calculated data from which the cam was initially prepared and which was used to make up the cam cutting tape, such as tape 100, in the above described embodiment, as shown in FIG. 14. This comparison will determine the amount of error in the characteristics of the cam, such as a master cam, and indicate whether it is over-size or under-size.

Figure 13:
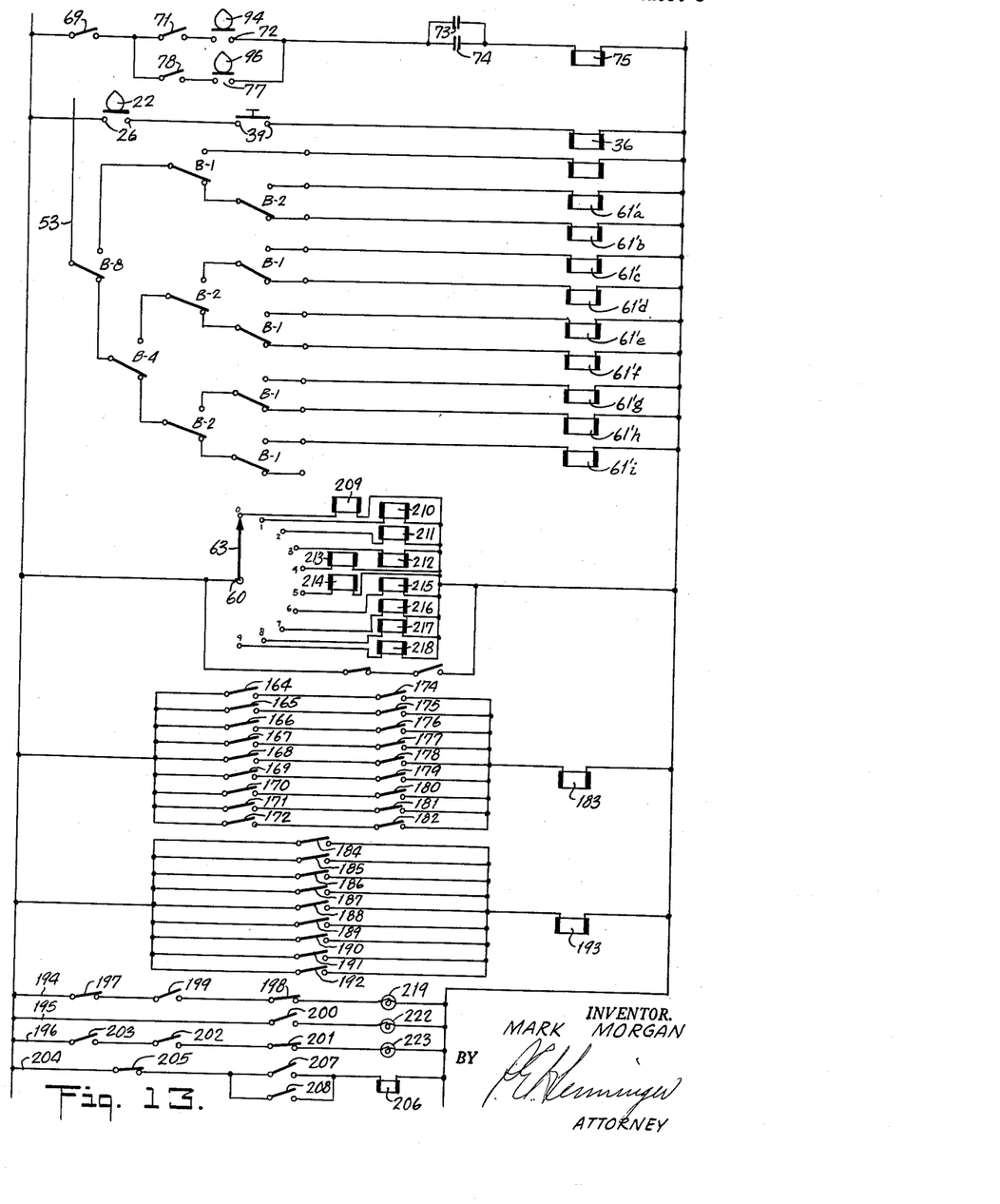

Another circuitry for checking a cam is shown in FIG. 13. In the operation of the checking system shown in this circuitry, the rotary table 14 of FIG. 14 is rotated in a standard manner to operate the cam 22 shown in FIGS. 13 and 14. The stylus 220 shown in FIG. 14 serves to operate the longitudinally movable table 16, as described above in connection with the system in FIGS. 11, 12 and 14. The stylus follows the cam surface to direct the movement of the table 16 through the generator 28, as described above. This movement is reflected in the operation of the forward and reverse cams 94 which advance counter emitters of which emitter 60 is the forward emitter in the counter 31 of FIG. 14.

The cam cutting tape 100 is rerun through the read-out unit 29, and the binary coded data is translated to operate the decimal relays, shown in FIG. 13 in schematic form. As the table moves longitudinally in a forward direction, cam 94 pulses coil 75 of forward counter and advances slider 63 of emitter 60. A group of parallel conductors each contain one of the parallel contacts 164 through 172 in series with a group of relay actuated switches 174 through 182 and in series with an auxiliary relay 183. A group of contacts 184 through 192 are connected in series with an auxiliary relay 193. A circuit for indicating under-size, on-size and over-size readings is shown in FIG. 13, made up of circuit conductors 194, 195 and 196. The circuit conductor 194 has normally closed switches 197 and 198 in series with each other and a normally open switch 199. The circuit conductor 195 has a normally open switch 200 and the circuit conductor 196 has a normally closed switch 201 in series with normally open switches 202 and 203. A conductor 204 carries a normally closed switch 205 in series with an auxiliary relay 206 and a pair of parallel normally open switches 207 and 208. The relay 193 controls switches 199 and 203, so that the energization of relay 193 closes these normally open switches. The relay 183 controls switches 198, 200, 201 and 207, so that energization of relay 183 opens the normally closed switches 198 and 201 and closes the normally open switches 200 and 207. The relay 206 controls switches 202 and 208 serving to close these normally open switches when energized. The normally closed switch 205 is suitably operated by the emitter 60.

The emitter 60 controls a group of relays 209 through 218 which represent each of the incremental steps of the table 16. These relays, in turn, each control two switches, one in each of the groups 164 through 172 and 184 through 192. The energization of one of the emitter relays, such as relay 211, automatically closes switches 166 and 186 in their respective circuits. When switch 186 is closed, the relay 193 is energized and the switches 199 and 203 are closed. If switch 176 is closed by the energization of the third decimal solenoid, the relay 183 will be closed.

In the operation of the digital gauging system, shown in FIG. 13, when the stylus reaches equilibrium at the selected point, both the switches in the series 164 to 172 and 174 to 182 will be closed energizing the auxiliary relay 183. This completes the on-size circuit and indicates an on-size or correct reading. The switches 198 and 201 are opened and the switches 200 and 207 are closed, for example, as will occur when the relay 211 closes switch 166 and the third decimal relay 61g closes switch 176. With the on-size or correct reading thus indicated, the under-size circuit conductor 194 and the over-size circuit conductor 196 are disconnected by the open switches 198 and 201.

In the operation of this system if the emitter 60 does not indicate a correct reading by energizing a relay which corresponds to the binary solenoid energized by the tape 100, then the relay 183 is not energized. This brings into play the auxiliary relay 193, which is energized by the closing of any one of the switches 184 through 192. If the reading indicates under-size, the switch 199 in the circuit conductor 194 will be closed. A yellow light 219 is connected in the conductor 194 as an indicator. If the reading is over-size, the emitter will momentarily energize the relay 183 by closing switch 166 as it passes the circuit for the relay 211, assuming that the correct reading is three increments, which would call for energization of the third decimal relay 61g. The over-size nature of the cam causes the emitter 60 to pass beyond the relay 211 and by the consequent de-energization of relay 183 to bring about a reclosing of switches 198 and 201 and the reopening of switch 200. Switch 203 remains closed by the relay 193, which is now conducting through one of the switches between 187 and 192. Switch 202 has been closed by the energization of relay 206 at the time that switch 207 was closed. The switch 208 acts to hold the circuit through conductor 204 when switch 207 reopens upon de-energization of relay 183. The closing of switch 201 thus completes the circuit through circuit conductor 196 and lights a lamp 223 provided as an indicator. A lamp 222 is provided in circuit conductor 195 as an on-size indicator. Finally, in the operation of the system, the circuit conductor 204 is opened by the opening of switch 205 in the operation of the emitter 60 to de-energize the relay 206 and light the indicating circuitry to return to normal.

In summary, the advancing emitter energizes successively the solenoids 209 through 218. The decimal relays are energized by the return of the tape 100 to close one of the switches 174 through 182. The successively energized emitter solenoids 209–218 successively close switches 164–172 and 184–192. In doing so, they continually energize relay 193 to close the circuit conductor 194. The continued advance of the emitter 60 to the on-size position operates the relay 183 to close the circuit conductor 195. The advance of the emitter 60 beyond the on-size position de-energizes relay 183 and closes the over-size circuit conductor 196.

The above-described embodiment of this invention may be modified without departing from the spirit thereof. The above embodiment provides a relatively smooth, contoured cam surface at an angular indexing of 1°. It will be readily understood and means are indicated for providing a ½° of rotation indexing. This ½° indexing is preferable for larger cams; likewise, for ¼° and ⅛° indexing which can be readily obtained by small modifications of the operating cams 22 and 23.

The generator control of FIG. 8 may be wired in direct relation to the variable rotary table speed control system of FIG. 10. The speed control for the longitudinal movement of horizontal table 16, in such a modification, provides five separate sets of resistors corresponding to the five separate rotary table speeds provided by the apparatus of FIG. 10. The control for the generator 28 may be modified to accommodate the various rotary table speeds which are constant for each particular setting. The speed control for the longitudinal table in such a modified control contains five separate sets of resistors corresponding to each of the possible rotary table speeds, while the forward and reverse switches and the generator 28 remain the same as shown in FIG. 8.

In employing the modification, the cam blank from which the master cam is to be cut, is mounted on the rotary table 14 as described above and the rate of angular movement is manually selected to determine the rate of feed. This selection operates the appropriate contacts in the modified apparatus to connect appropriate field resistors to the field amplifier of generator 28 and to provide proper proportional incremental, longitudinal movement of the horizontal table 16. It is a feature of this invention that the rate of feed of the horizontal table 16 in a longitudinal direction is proportional to the increment of movement between fixed points on the rotary table and the proportional rate of angular movement of the rotary table between these fixed points.

The above description is set forth for the purpose of illustrating the principles of this invention. As mentioned above, this invention is not limited to cutting cams or to a vertical milling machine. The invention involves a control system for machine tools employing a numerical data-storage system for the control. It is, therefore, intended that the invention be limited only by the scope of the appended claim.

What is claimed is:

In a system for moving an instrumentality so that the periphery of said instrumentality describes a continuous closed loop in relation to a point removed from said periphery, a first motive means for said instrumentality operable to rotate the same to provide equal increments of arc in equal increments of time, a series of input datum manifestations available at successive periodic intervals of time indicative of the distance $n$ required between said point and the periphery of said instrumentality at each increment of time, a second motive means for moving said instrumentality radially a distance $n$, speed control means for said second motive means responsive to said input datum manifestation to provide a rate of movement of said instrumentality $n/N$ where $N$ is the maximum distance $n$ which will be traveled between any successive intervals of time whereby the locus of movement of said instrumentality with respect to said point is generated in equal increments of distance in equal increments of time.

References Cited in the file of this patent

UNITED STATES PATENTS

| | | |
|---|---|---|
| 2,445,971 | Rosen | July 27, 1948 |
| 2,690,532 | Johnson | Sept. 28, 1954 |
| 2,741,732 | Cunningham | Apr. 10, 1956 |
| 2,784,359 | Kamm | Mar. 5, 1957 |
| 2,792,545 | Kamm | May 14, 1957 |
| 2,927,258 | Lippel | Mar. 1, 1960 |

OTHER REFERENCES

Machine Tool Control From a Digital-Analog Computer; NACA by Mergler et al., Sept. 11, 1952.

A Numerically Controlled Milling Machine, Final Report; by Servo Mechanism Lab., M.I.T., May 31, 1953.